No. 729,197. PATENTED MAY 26, 1903.
E. MATHIEU.
MOTOR CYCLE GEAR.
APPLICATION FILED APR. 16, 1902.
NO MODEL. 2 SHEETS—SHEET 1.
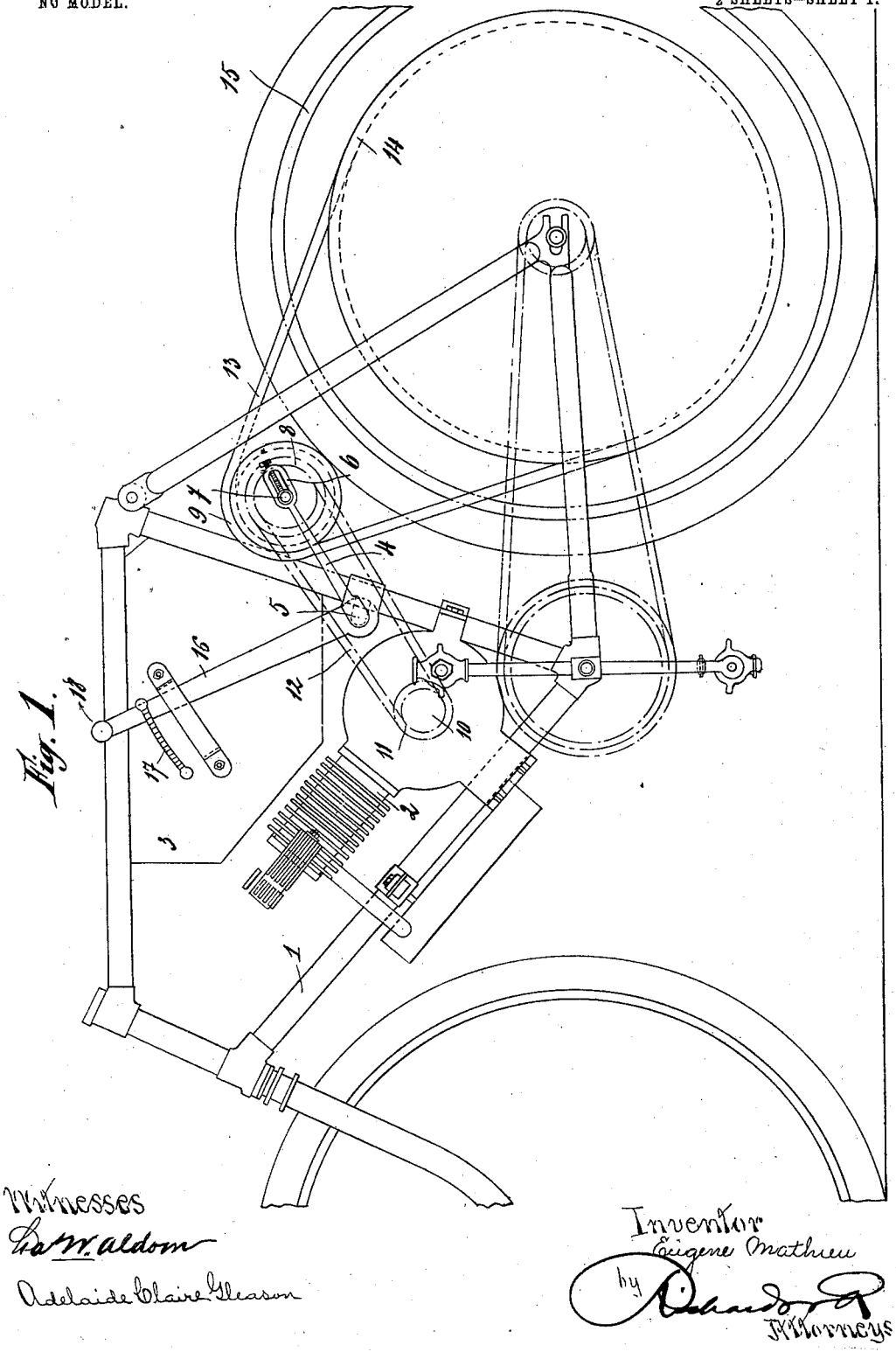

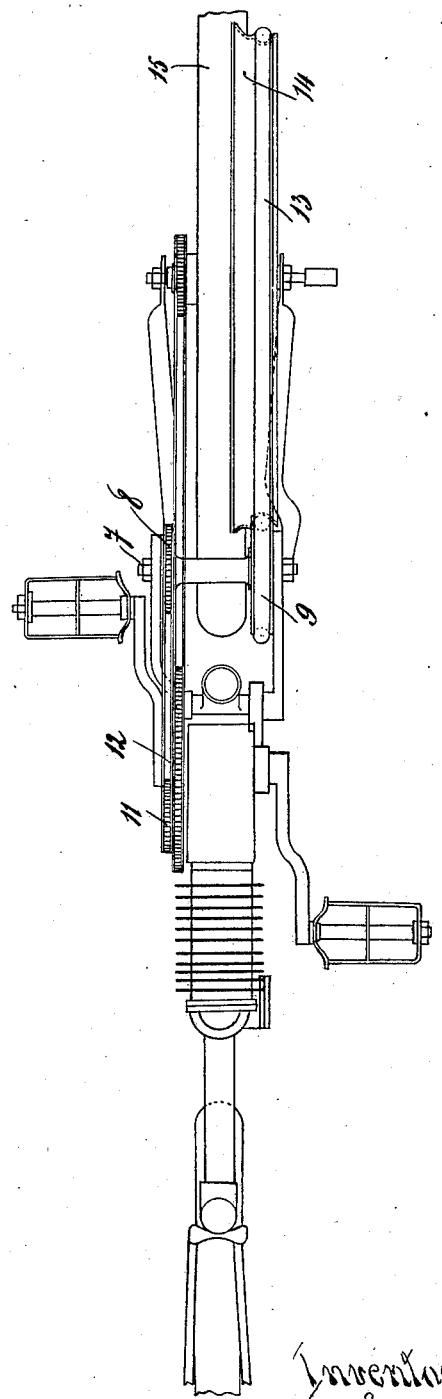

No. 729,197.

Patented May 26, 1903.

UNITED STATES PATENT OFFICE.

EUGÉNE MATHIEU, OF LOUVAIN, BELGIUM.

MOTOR-CYCLE GEAR.

SPECIFICATION forming part of Letters Patent No. 729,197, dated May 26, 1903.

Application filed April 16, 1902. Serial No. 103,135. (No model.)

*To all whom it may concern:*

Be it known that I, EUGÉNE MATHIEU, engineer, a citizen of the Republic of France, residing at 37 Rue de la Station, Louvain, in the Kingdom of Belgium, have invented certain new and useful Improvements in Motor-Cycle Gear, of which the following is a specification.

This invention relates to motor-cycle gear. Such gear as hitherto in use may be divided into two classes—namely, gear in which the motion is communicated by means of friction-rollers and gear in which the motion is communicated by chains or bands. Each of these kinds of gear, as is well known, possesses more or less important advantages and objections. Friction-roller gears possess the advantage that they can be easily disengaged. On the other hand, they in a measure limit the speed at which it may be desired to travel by reason of the diameter of the friction-roller, which cannot exceed certain dimensions. They wear out the rim of the driving-wheel and operate under conditions more or less favorable, according to the circumstances. Chain or band gears as hitherto generally constructed if they offer the advantage of allowing of employing pulleys the dimensions of which may vary within wider limits they cannot generally be made so that they can be put out of engagement and work more or less well, according to the degree of tension of the chain or band. Moreover, the driving-pulley actuated by the motor, having regard to its relatively small and limited dimensions, only offers a very small contact-surface to the band or chain, so that the useful effect of the gear is considerably diminished.

My invention relates to a gear of the kind comprised in the second class. It has for object to overcome these various objections and to consequently provide a chain or band gear which can be put in and out of engagement as required in which the reduction of speed can be varied within wider limits, while allowing of employing pulleys of sufficient diameter to always present the necessary contact-surface to obtain a maximum of efficiency, and in which the adjustment of the tension of the chain or band is insured at all times without necessitating the recutting and shortening of the chain or band.

The invention consists chiefly in the combination, in a motor-cycle gear, of two different transmitting elements effecting a double reduction of speed, one of which consists of a chain, spur, or other similar gear adapted to be approximately concentrically displaced with relation to the motor-shaft and the other of which consists of a strap or band gear the engagement, disengagement, and regulation of tension of which are effected by the displacement of the first element concentrically to the motor-shaft.

Referring to the annexed drawings, Figure 1 is a front view, and Fig. 2 a plan view, of a motor-cycle fitted with a gear constructed according to my invention.

In carrying out my invention I arrange in a suitable position upon the cycle-frame 1 a fork or bracket 4, adapted to pivot upon a pin 5 and carrying in forks 6 a spindle 7, the position of which is adjustable and upon which is mounted a boss carrying on one side a toothed wheel 8 and on the other a grooved pulley 9. On the shaft 10 of the motor 2 is arranged a toothed wheel 11, actuating the other toothed wheel 8 by means of a chain 12, and in the groove of the pulley 9 passes a band or strap 13, driving a pulley 14, fixed in the usual manner to the driving-wheel 15 of the motor-cycle. I thus provide two different elements or gears for communicating motion, one consisting of the two toothed wheels 8 11 and chain 12 and the other consisting of the two grooved pulleys 9 14 and strap or band 13. The first of these gears can be displaced concentrically or practically concentrically around the shaft 10 of the motor 2 by means of a lever 16, which is adapted to cause the fork or bracket 4 to turn upon its pin 5 and also adapted to be fixed in various positions upon a locking-sector 17, mounted, for example, upon one of the side faces of the carbureter 3. Owing to this arrangement the effect of any displacement of the first gear in one or the other direction will be to increase or diminish the tension of the belt or band 13, and the result of a complete displacement in the direction of the arrow 18 will be to cause a slackening of the belt or band 13 and to effect the disengagement of the gear driving the cycle-wheel 15. Consequently the gear can be put in and out of engagement with the greatest facility by simply operating the lever 16. On the other hand, as will be readily understood, a first reduction will be effected between the two toothed wheels 11 8, so that the diameter of the pulley 9 can be increased, so as to always afford to the strap or band 13 the necessary contact-surface indispensable for obtaining a good result. The total reduction can, on the other hand, be varied within particularly extensive limits by simply changing the toothed wheel 7 and pulley 9, mounted in the bracket.

The manipulation or displacement of the lever 17 can be easily effected when running in order to regulate the tension of the belt or strap 13 on account of the fact that the position of the intermediate elements 8 9 relatively to the driving and driven parts is such that the strains exerted by the chain 12 and the belt 13 balance each other, the strain due to chain 12 tending to rotate the bracket 4 in a direction opposite to that due to the strain of belt 13. This feature also is an important one, as it greatly facilitates the handling of the gear.

In the preceding description I have referred to the bracket 4 as being capable of turning on a pin 5, fixed to one of the tubes of the frame 1. It is obvious that in this arrangement the arc of a circle described by the center of the pin of the toothed wheel 8 is not absolutely concentric with the motor-shaft 10. Although the difference of radius may be very small in practice, the axis itself of the motor can, however, be given as the center of rotation of the bracket and the uniformity of tension of the chain 12 be thus insured in any position of the toothed wheel. It will also be understood that I do not confine myself exclusively to the arrangement hereinbefore described and that any other suitable position can be given to the intermediate members consisting of the toothed wheel 8 and pulley 9 in the bracket. The chain and toothed-wheel gear constituting the first element of the driving mechanism can also without departing from the principle of my invention be replaced by spur-gear or by any other suitable equivalent device.

What I claim is—

1. In a motor-cycle gear in combination with the motor and the cycle driving-wheel, a transmitting-gear consisting of a chain-gear and a strap-gear transmitting power to the cycle driving-wheel, the tension of said strap-gear being regulated by the displacement of the chain-gear approximately concentrically to the motor-shaft, the said chain-gear and strap-gear being located relatively to the motor-shaft and the cycle driving-wheel so that the strains exerted by said gears balance each other, a bell-crank lever pivoted to the cycle-frame on one arm of which the chain-gear is adjustably journaled, the other arm of the bell-crank being provided with a suitable handle, substantially as described and for the purpose set forth.

2. In a motor-cycle gear in combination with the frame of the cycle, the motor and the cycle driving-wheel, a bracket adapted to pivot on the frame of the cycle, a spindle carried by said bracket, a boss mounted on said spindle and carrying a toothed wheel and a grooved pulley, a chain actuated from the motor-shaft and actuating the toothed wheel with a reduction of speed, a belt or strap passing in the grooved pulley and actuating the cycle driving-wheel with a second reduction of speed and means for displacing the bracket approximately concentrically to the motor-shaft in order to vary the tension of the belt, substantially as described and for the purpose set forth.

In witness whereof I have hereunto set my hand in presence of two witnesses.

EUGÉNE MATHIEU.

Witnesses:
GEORGE BEDE,
GREGORY PHELAN.